United States Patent [19]

Laughlin

[11] 4,129,780

[45] Dec. 12, 1978

[54] ACTIVE IMAGING SYSTEM USING TIME PROGRAMMED DWELL

[75] Inventor: Richard H. Laughlin, Richardson, Tex.

[73] Assignee: Varo, Inc., Garland, Tex.

[21] Appl. No.: 809,052

[22] Filed: Jun. 21, 1977

[51] Int. Cl.² .............................................. H01J 31/49
[52] U.S. Cl. ....................................... 250/333; 250/341
[58] Field of Search ............... 250/330, 332, 333, 338, 250/340, 341; 356/5; 343/5 PD, 6 ND

[56] References Cited

U.S. PATENT DOCUMENTS

| | | | |
|---|---|---|---|
| 3,774,043 | 11/1973 | LeCarvennec | 250/333 X |
| 4,063,093 | 12/1977 | Astheimer et al. | 250/333 X |

*Primary Examiner*—Davis L. Willis
*Attorney, Agent, or Firm*—Richards, Harris & Medlock

[57] ABSTRACT

An imaging system for detection of a target is provided which compensates for range dependency of a reflected interrogating signal. The imaging system includes an electromagnetic radiation source for generating a series of interrogating pulse signals directed towards the target. A receiver is provided and operable to be triggered for receiving during preselected time intervals the reflected interrogating pulse signals from the target and for generating a resultant output signal. The system further includes circuitry connected for triggering the receiver to receive reflected interrogating pulse signals according to a predetermined time function. The number of reflected interrogating pulse signals thus received by the receiver is dependent on the distance between the receiver and the target. The receiver thus generates a resultant output signal to provide a signal of constant amplitude independent of the distance between the receiver and target.

31 Claims, 3 Drawing Figures

ACTIVE IMAGING SYSTEM USING TIME PROGRAMMED DWELL

FIELD OF THE INVENTION

This invention relates to active imaging systems, and more particularly relates to an imaging system which compensates for the range dependence of the intensity of a reflected interrogation signal returned from a target.

THE PRIOR ART

A problem in the detection of targets utilizing active illuminators to generate an interrogation signal is the range dependency of the returned reflected interrogation signal from the target. This problem of range dependency of the returning interrogation signal has been recognized in radar systems, laser range finders and other optical interrogation systems. The reflected signal strength or irradiance from the target is defined by the standard radar range equation known to those skilled in the art. Signal power (P) is a function of the target crossed section, the range to the target and the integrating radiant intensity. The signal power (P) can be defined by the following equation:

$$P(\text{watts}) = \frac{P_{peak} d E_c T \sigma}{\Omega R^4} \tag{1}$$

where
  $P_{peak}$ is the peak power output of the illuminator;
  d is the duty cycle of the illuminator;
  $E_c$ is the optical collection efficiency;
  $\Omega$ is the projected beam width;
  $\sigma$ is the target cross-section;
  R is the range of the target; and
  T is the transmission of the receiving optical system.

It therefore can be seen that the signal power (P) is a function of the range (R) to the target by a factor of the reciprocal of range to the fourth power. In image intensifier receivers, therefore, it is desirable to compensate for the decrease in signal intensity as the range to the target increases. Such a system to compensate for the range of the target should present a signal to an operator which will not substantially vary as a function of range. In the case of an active illuminator system, such a range compensator should thus result in the viewing of a target with constant brightness.

Prior systems using discrete detectors have utilized a time programmed gain such that the detector gain increases as a function of time to the fourth power. This gain increase maintains a constant signal output which is independent of range for a constant cross-section target. Additional past imaging systems have utilized high peak power pulsed illumination systems in conjunction with gated imaging systems to gate out unwanted background or look through undesirable foreground clutter. However, these systems have had the disadvantage that the interrogation signal returned from the target is range dependent, such that signals from targets at longer ranges were weaker, by the fourth power of the range ratio, than the signals from targets at short ranges. This disadvantage results in obscuring targets at long ranges and saturating the system by targets at short ranges.

A need has thus arisen for an imaging system which will accurately represent to an operator the presence of targets both at long and short ranges. A need has further arisen for an imaging system which will compensate for the range dependent brightness of the reflected interrogation signal returned from a target. Furthermore, such a system should have the capability of gating out unwanted background and foreground clutter.

SUMMARY OF THE INVENTION

The present invention is directed to an active imaging system which compensates for the range dependent brightness of a reflected interrogation signal returned from a target, which substantially eliminates or reduces the disadvantages associated with prior art imaging systems.

In accordance with the present invention, an imaging system for detection of a target comprises an electromagnetic radiation source for generating a series of interrogating pulse signals directed towards the target. A receiver is provided and operable to be triggered for receiving during preselected time intervals reflected interrogating pulse signals from the target and for generating a resultant output signal. The system further includes circuitry connected for triggering the receiver to receive reflected interrogating pulse signals according to a predetermined time function such that the number of reflected interrogating pulse signals received by the receiver is dependent on the distance between the receiver and the target. The receiver thus generates a resultant output signal to provide a signal of constant amplitude which is independent of the distance between the receiver and the target.

In accordance with another aspect of the present invention, an active imaging system for detection of a target includes a laser for generating a gated interrogating signal having a fixed gate width and directed towards the target. A gated image intensifier is provided for being triggered to receive reflected interrogating signals from the target during preselected fixed window intervals. Circuitry is provided for synchronizing the operation of the laser and the image intensifier. The system further includes circuitry interconnected between the synchronizing circuitry and the gated image intensifier for triggering the image intensifier to receive reflected interrogating signals during the preselected fixed window intervals at a rate dependent upon the distance between the target and the image intensifier. The image intensifier further includes circuitry for integrating the received reflected interrogating signals to generate a resultant signal of constant amplitude independent of the distance between the image intensifier and the target.

In accordance with yet another aspect of the present invention, a method employing an imaging system for detection of a target includes generating an interrogating signal having a fixed gate width directed towards the target. The method further includes receiving at a receiver the reflected interrogating signals from the target during preselected fixed window intervals. The receiver is triggered to receive the reflected interrogating signals during the preselected fixed window intervals. The triggering is dependent upon the distance between the target and the receiver.

DESCRIPTION OF THE DRAWINGS

For a more complete understanding of the present invention and for further objects and advantages thereof, reference is now made to the following description taken in conjunction with the accompanying drawings, in which.

DESCRIPTION OF THE PREFERRED EMBODIMENT

Figure 1:
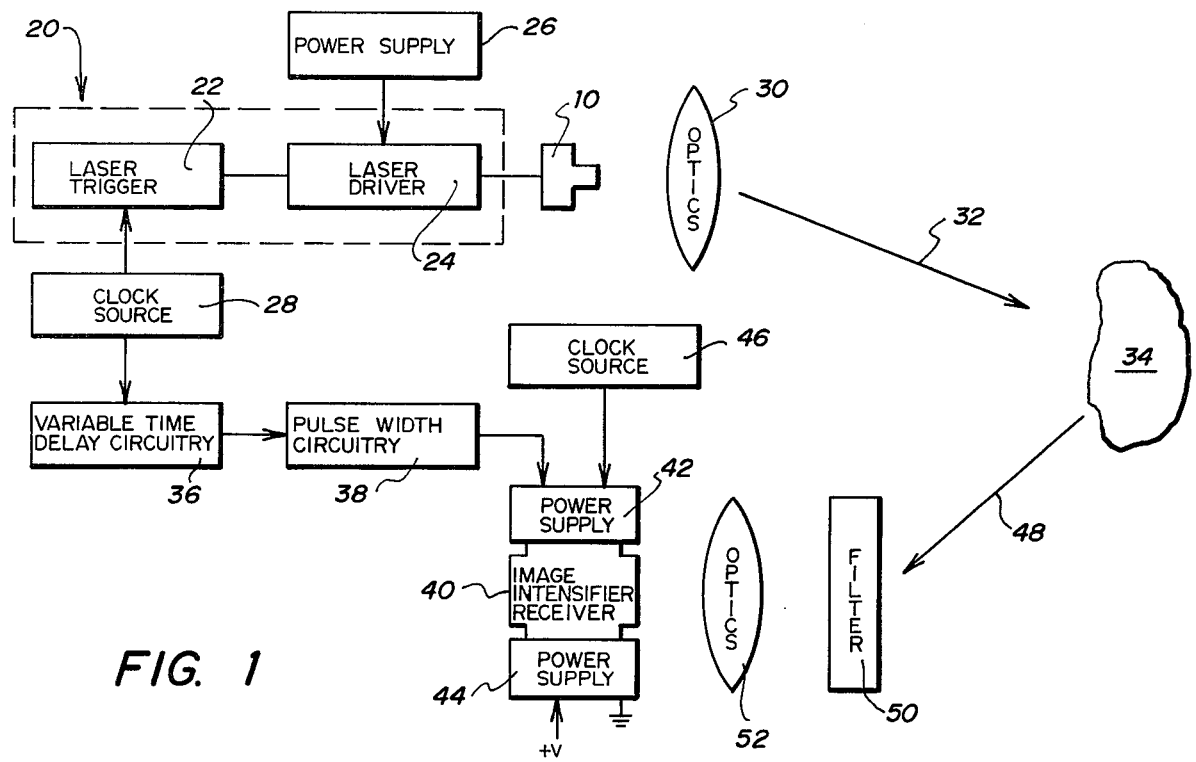
FIG. 1 is a block diagram of the present imaging system.

Referring to FIG. 1, a block diagram of the present active imaging system is illustrated. The system includes a source of electromagnetic radiation, such as a laser diode array 10 and associated circuitry, generally identified by the numeral 20. Although a laser is illustrated as the source of electromagnetic radiation for illuminating the target, it will be understood that the present system can also use a radar or any optical source, such as a broad band optical source including a Xenon flash lamp, for generating an interrogating signal. The laser diode array 10 may comprise, for example, a Model LD-360 diode array manufactured and sold by Laser/Diode Laboratories, Inc. of Metuchen, N.J. Such a laser diode array has a peak power of 600 watts and the capability of converting electrical current into optical energy radiated at 820 nanometers.

The laser diode array associated circuitry 20 includes a laser trigger 22 interconnected to a laser driver 24, which provides an output to the laser diode array 10. The laser trigger 22 and laser driver 24 may comprise, for example, a complete module such as Model LP-200 manufactured and sold by Laser/Diode Laboratories, Inc. Also associated with the laser driver 24 is a power supply 26.

An input to the laser trigger 22 is supplied from a clock source 28. Clock 28 in the preferred embodiment generates a 2,000 Hertz clock pulse for synchronizing the radiation source and the receiver of the present system. Clock source 28 may comprise, for example, Model 116 manufactured and sold by Systron-Donner Corporation of Van Nuys, Calif. or Model CO 231 manufactured and sold by Vectron Laboratories, Inc. of Norwalk, Conn.

The output of the laser diode array 10 is applied through an optical beam forming device 30 which projects the generated electromagnetic radiation into a six degree beam, represented by the arrow 32, to impinge upon a target 34. The output of the laser diode array 10 will be hereinafter referred to as an interrogating beam or series of interrogating pulse signals directed to impinge upon a target. In the preferred embodiment, the system is operable to detect targets lying between the range from about 500 to about 4,000 meters from the source of electromagnetic radiation.

Clock source 28 also provides an output to variable time delay circuitry 36, the function of which will be subsequently described. The output of variable time delay circuitry 36 is applied to pulse width circuitry 38 which drives an image intensifier receiver 40. Receiver 40 may comprise a gated detector such as a PIN diode, which sweeps out an image plane, or a gated discrete solid state detector array including charge coupled or charge injected devices. In the preferred embodiment, the receiver 40 comprises a gated image intensifier which is normally gated off and is gated on only to receive reflected interrogation pulse signals from the target 34 within a range window. The image intensifier receiver 40 may comprise, for example, a 25 millimeter microchannel inverter intensifier, Model 3603 manufactured and sold by Varo Electron Devices, Inc. of Garland, Tex. The receiver 40 also includes associated power supplies 42 and 44 which are gated power supplies and may comprise, for example, Model 3265 manufactured and sold by Varo Inc., Power Systems, Division. The receiver 40 further includes a clock source 46 which functions with the pulse width circuitry 38 to trigger the receiver 40 and to allow the setting of a convenient pulse width, or range window which in the preferred embodiment may range from about 2 microseconds to about 200 microseconds. The clock source 46 may comprise, for example, Model 116 manufactured and sold by Systron-Donner Corporation.

Briefly stated, the function of the time delay circuitry 36 is to control the gating of the receiver 40 such that as the range between the target 34 and the receiver 40 increases the gate delay of successive gate windows continues to increase as a function of time, but the rate of this increase, decreases as a function of time. This variable delay has the effect of causing successive range windows to have greater overlap at large distances so that the number of received reflected interrogating pulse signals received by receiver 40 increases as the distance between the receiver 40 and the target 34 increases.

The receiver 40 receives reflected interrogating pulse signals identified by the arrow 48 from the target 34 through a bandpass filter 50 and an objective lens 52. In the preferred embodiment, the bandpass filter 50 may comprise a 100 angstrom bandpass filter and the objective lens 52 may comprise a 155 millimeter lens. The output of the receiver 40 may then be applied to a display for viewing by an operator to visually display the target or applied through appropriate eye pieces or camera adaptors to an SLR camera. The receiver 40 includes circuitry to integrate the number of reflected interrogating pulse signals from the target received from specific discrete range locations lying between the receiver and the target 34 to generate a resultant signal for application to a display.

In operation, the laser diode array 10 generates a series of interrogating pulse signals of constant amplitude and rate. For each interrogating pulse signal generated by the laser array 10, the receiver 40 receives a reflected interrogating pulse signal prior to the generation of a subsequent interrogating pulse signal by the laser diode array 10. The gating of the image intensifier receiver 40 produces a pulse having a narrow window width which in the preferred embodiment is two microseconds long. The gating function, creates a time delay between successive windows. During each gate or range window, the receiver 40 receives reflected interrogating pulse signals. The maximum delay between successive range windows of the receiver 40 in which the receiver 40 receives reflected interrogating signals 48 ranges from approximately 5.2 nanoseconds to approximately 1 microsecond over a distance of from about 4000 to about 500 meters between the receiver 40 and a target 34.

The present invention controls the delay between successive range windows, such that the range window through which reflected interrogating pulses 48 are received by the receiver 40 sweeps out through the distance between the receiver 40 and the target 34 at a variable rate proportional to the inverse of the fourth power of range. As the range between the target 34 and receiver 40 increases, the time duration between successive range windows decreases so that the range windows overlap. This overlapping of the range windows as the discrete range segment moves between the receiver 40 and target 34 causes the receiver 40 to receive a greater number of reflected interrogating pulse signals 48 at a particular range from distant targets as opposed to the number from close-in targets. Since the receiver 40 integrates the receiver reflected interrogating signals 48, as the received number of signals for a discrete range increases the output of the receiver 40 will also increase. The corresponding increase in output of receiver 40 in turn generates an increased resultant signal to the display to maintain a constant image of the target independent of the range to the target.

The rate at which the range window sweeps the distance between the receiver 40 and the target 34 is such that it compensates for the fourth power range factor to proportionally increase the number of received reflected interrogating pulse signals 48 integrated by receiver 40 as the range increases. The number of integrations performed for a given discrete range equals the gate width of the receiver window divided by the variable incremental pulse delay between range windows:

$$\text{Number of integrations} = \frac{\text{gate width}}{\Delta t_n} ; \qquad (2)$$

where $\Delta t_n$ represents the variable incremental pulse delay.

The variable incremental pulse delay selected between successive range windows is controlled by the variable time delay circuitry 36 to generate a function ($\Delta T$) which is proportional to the fifth root of time to generate a function ($\Delta t_n$) whose rate is proportional to the fourth power of range. The $\Delta T$ function can be represented by the following equation:

$$\Delta T = K_1 N^2 \qquad (2)$$

where N represents the number of time increments and $K_1$ represents a constant.

$\Delta t_n$ is the incremental difference between delayed pulses and represents the time rate of change of $\Delta T$ or the time rate of change of range (R). Range can be expressed as:

$$R = c\Delta T/2 \qquad (4)$$

where c is the speed of light. Substituting for the value of $\Delta T$ from Equation 3 into Equation 4 yields:

$$R = cK_1 N^2 = K_2 N^2, \qquad (5)$$

where $K_2$ is a constant. The time rate of change of range is given by:

$$\dot{R} = .2K_2 N^{-.8} = K_3 N^{-.8} \qquad (6)$$

where $K_3$ is a constant. Rewriting Equation 5 to solve for N, the value of N becomes:

$$N = R^5/K_2^5 = K_4 R^5 \qquad (7)$$

where $K_4$ is a constant. Substituting the value of N from Equation 7 into Equation 6 produces:

$$\dot{R} = K_3(K_4 R^5)^{-.8} = K_5 R^{-4} \qquad (8)$$

where $K_5$ is a constant. Therefore, it can be seen that the incremental difference between delayed pulses is proportional to the inverse of the fourth power of range. The number of integrations equals, substituting for $\Delta t_n$ in Equation 2 yields:

$$\text{Number of integrations} = \frac{\text{gate width}}{K_5 R^{-4}} \qquad (9)$$

The output of the image intensifier 40 may be represented by the following equation:

$$\text{Intensifier output} = K_6 \int H \, dt; \qquad (10)$$

where $K_6$ represents the gain of the system, a constant, and H represents the signal irradiance. The integral of H dt equals the signal irradiance multiplied by the number of integrations performed by the receiver 40. The intensifier output may be then represented by the equation:

$$\text{Intensifier output} = K_6(H) \text{ (number of integrations per range window)} \qquad (11)$$

Making a further substitution, the value of signal (H) is equal to:

$$\frac{P_{peak} dE_c \sigma}{\Omega R^4} = \frac{K_7}{R^4}, \qquad (12)$$

where $K_7$ is a constant. Substituting the value of the number of integrations, from Equation 9 and the value of H from Equation 12, the intensifier output can be represented by the following equation:

$$\text{Intensifier output} = \frac{K_6 K_7 \text{ gate width}}{R^4 K_5 R^{-4}} = K_8. \qquad (13)$$

It can be seen that the fourth power of range cancels to indicate that the intensifier output is a constant value, $K_8$, independent of the range between the receiver 40 and the target 34.

It therefore can be seen that the variable time delay circuitry 36 causes the range window to initially walk out rapidly between the receiver 40 and the target 34. As the gated window walks out to range segments moving towards the maximum target range, the walk rate slows, such that the incremental delay between successive windows decreases to cause the windows to overlap and overlap a greater amount for a particular range between the receiver 40 and the target 34. The range window walk rate is proportional to the inverse of the range to the fourth power such that the number of received reflected interrogating pulse signals 48, received by the receiver 40 at a particular range segment is proportional to the fourth power of range. Since the number of received reflected integrating pulse signals increases proportionally to the fourth power of range, the resultant output of the receiver 40 is proportionally increased corresponding to the fourth power of range to compensate for the decrease in the amount of energy reflected as the distance between the receiver 40 and target 34 increases.

Figure 2:
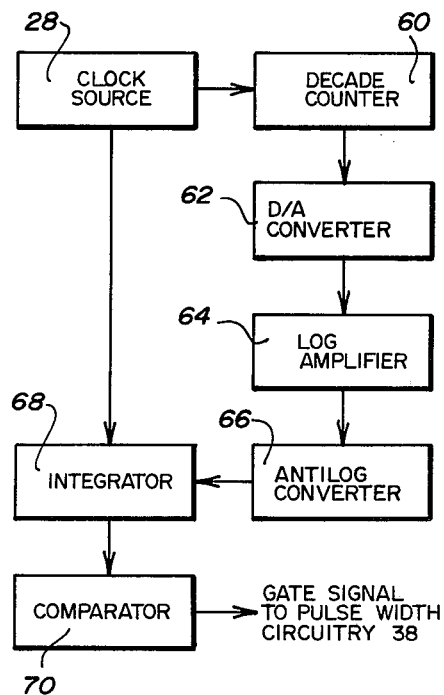
FIG. 2 is a block diagram of the variable time delay circuitry of the present invention.

The circuitry for generating the time function to control the delay between successive range windows is illustrated in the block diagram of FIG. 2. The clock source 28 provides a symmetrical pulse to a decade counter 60. In the preferred embodiment the clock source provides a 2,000 Hertz pulse. The decade counter may comprise, for example, an MC 7490 I/C which counts the number of pulses provided by the clock source 28. Decade counter 60 in the preferred embodiment counts between 1 and 1024 pulses and automatically resets itself upon completion of counting to 1024 pulses. This range of pulses is selected in the preferred embodiment to correspond to a particular maximum range between the receiver 40 and target 34. The number of pulses counted by decade counter 60 is then applied to a digital-to-analog converter 62. Digital-to-analog converter 62 may comprise, for example, an MDA 10 F analog device, which provides a voltage output proportional and defined by: $V = K(N)$, where K represents a constant and N represents the number of pulses output from decade counter 60.

The output of digital-to-analog converter 62 is applied to a logarithmic amplifier 64. Amplifier 64 may comprise, for example, a 755N analog device which generates a voltage function equal to $0.2 \log(K\ N)$. The output of amplifier 64 is applied to an antilogarithmic converter 66, which may comprise, for example, a 755N analog device. The antilogarithmic converter 66 generates a voltage function represented by the equation:

$$V = K_1 N^2 \tag{14}$$

The output of antilogarithmic converter 66 together with the output of clock source 28 is applied to an integrator 68. Integrator 68 may comprise, for example, an LH 0053 I/C which is reset for each clock pulse. The output of integrator 68 is applied to a comparator 70, which may comprise, for example, an NE 529 I/C. Comparator 70 together with integrator 68 generates a voltage function representing the delay between the interrogating pulse and the gate pulse as $\Delta T_n = K_1 N^2$, where $K_1 = 6.66 \times 10^{-6}$ seconds. This function in turn defines the incremental delay between successive gate windows as:

$$\Delta t_n = \Delta T_n - \Delta T_{n-1} \tag{15}$$

It can be seen that the total time delay function ($\Delta T$) experienced over the entire range between the receiver 40 and the target 34 is represented by the following equation:

$$\Delta T = \sum_{n=1}^{1024} \Delta t_n \tag{16}$$

From the equation it can be seen that the time delay between successive range window decreases, however, the total time delay function ($\Delta T$) increases over the entire range between the receiver 40 and the target 34. As the time delay between successive windows decreases, each range window overlaps consecutively by a greater amount such that a greater number of received reflected interrogating pulse signals 48 are received by the receiver 40 at the particular range segment being viewed by the receiver 40. Since there is one integration performed by the receiver 40 per each range window, as the number of windows overlap so do the number of integrations performed by the receiver 40 for the particular range window. Although FIG. 2 illustrates a particular circuit configuration for generating the time function to control the duration between successive range windows, it will be understood that additional circuit configurations may be utilized to generate a signal proportional to the inverse of the fourth power of range to control the range windows of the receiver 40.

Figure 3:
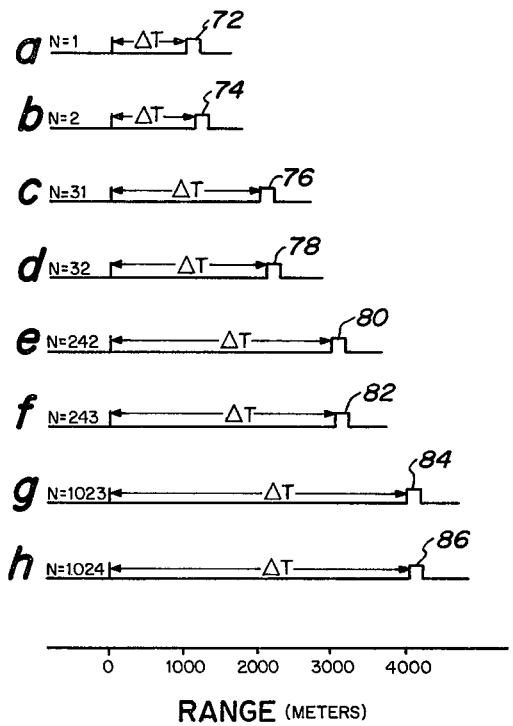
FIG. 3 is a diagram of waveforms illustrating the walk rate of the range window.

Referring to FIG. 3, waveforms illustrating specific examples of the shift and overlaps in range windows as the distance between the receiver 40 and the target 34 increases are illustrated. Referring to FIGS. 3a and 3b, range windows 72 and 74 having a width of 2 microseconds are illustrated where $N = 1$ and $N = 2$ in Equation 3. For $N = 1$, $\Delta T$ equals 6.66 microseconds, and for $N = 2$, $\Delta T$ equals 7.658 microseconds, where $$\Delta T = \sum_{1}^{N} \Delta t_n . \Delta t_n$$

therefore equals approximately 1 microsecond. The number of received reflected interrogating pulse signals is calculated using Equation 2 to equal 2 pulse signals received by the receiver 40 at the range of 1000 meters.

Referring to FIGS. 3c and 3d, the range windows 76 and 78 are illustrated and correspond to a range of 2000 meters wherein $N = 31$ and $N = 32$. It can be seen that the range windows 76 and 78 are shifted with respect to each other by a smaller time duration than range windows 72 and 74 so that the receiver 40 receives a larger number of reflected interrogating pulse signals to compensate for this increased range. For $N = 31$, $\Delta T = 13.249$ microseconds, and for $N = 32$, $\Delta T = 13.333$ microseconds. The resulting $\Delta t_n$ equals approximately 84 nanoseconds. The number of pulse signals received by the receiver 40 at a range of 2000 meters is therefore approximately 24.

Referring to FIGS. 3e and 3f, the range windows 80 and 82 are illustrated, which correspond to a range of 3000 meters. Where $N = 242$, $\Delta T = 19.984$ microseconds, and where $N = 243$, $\Delta T = 20.000$ microseconds. $\Delta t_n$ therefore equals approximately 16 nanoseconds. The number of pulses received by the receiver 40 therefore equals 2 microseconds divided by 16 nanoseconds or approximately 121 pulse signals.

The final example illustrated in FIG. 3 is shown in FIGS. 3g and 3h illustrating range windows 84 and 86 corresponding to a range of 4000 meters. For $N = 1023$, $\Delta T$ 26.661 microseconds, and for $N = 1024$, $\Delta T = 26.667$ microseconds. $\Delta t_n$ therefore equals approximately 5 nanoseconds to result in receiver 40 receiving approximately 384 interrogating pulse signals at a range of 4000 meters.

Whereas the present invention has been described with respect to specific embodiments thereof, it will be understood that various changes and modifications will be suggested to one skilled in the art, and it is intended to encompass such changes and modifications as fall within the scope of the appended claims.

What is claimed is:

1. An imaging system for detection of a target comprising:
    an electromagnetic radiation source for generating a series of interrogating pulse signals directed towards the target;
    receiver means operable to be triggered for receiving during preselected time intervals reflected interrogating pulse signals from the target and for generating a resultant output signal; and
    circuit means connected for triggering said receiver means to receive reflected interrogating pulse signals according to a predetermined time function such that the number of reflected interrogating pulse signals received by said receiver means is dependent on the distance between said receiver means and the target, said receiver means thus generating a resultant output signal to provide a signal of constant amplitude independent of the distance between said receiver means and the target.

2. The imaging system of claim 1 wherein said receiver means is operable to be triggered for receiving during preselected fixed time intervals reflected interrogating pulse signals from the target and for generating a resultant output signal.

3. The imaging system of claim 1 wherein the number of reflected interrogating pulse signals received by said receiver means increases as the distance between said receiver means and the target increases.

4. The imaging system of claim 1 wherein said interrogating pulse signals have a fixed gate width.

5. The imaging system of claim 1 wherein said receiver means receives reflected interrogating signals during fixed time intervals controlled by said circuit means.

6. The imaging system of claim 5 wherein said receiver receives reflected interrogating pulse signals during a plurality of said fixed time intervals, such that said fixed time intervals are delayed with respect to one another by said circuit means as the distance between said receiver means and the target increases.

7. The imaging system of claim 6 wherein said circuit means controls the time duration between successive triggerings of said receiver means such that the time duration between adjacent ones of said fixed time intervals in which said receiver receives reflected interrogating pulse signals decreases as the distance between said receiver and the target increases.

8. The imaging system of claim 7 wherein said receiver means integrates said received reflected interrogating pulse signals to form an optical image of the target.

9. The imaging system of claim 8 wherein the number of reflected interrogating pulse signals received and integrated by said receiver means increases as the distance between said receiver and the target increases.

10. The imaging system of claim 9 wherein the number of received reflected interrogating pulse signals received and integrated by said receiver means increases at a rate proportional to four times the distance between said receiver and the target.

11. The imaging system of claim 8 wherein the time duration between successive ones of said fixed time intervals in which said receiver means receives reflected interrogating pulse signals decreases at a rate proportional to the inverse of four times the distance between said receiver and the target.

12. The imaging system of claim 1 wherein said receiver comprises a gated image intensifier.

13. The imaging system of claim 1 wherein said receiver comprises a gated detector.

14. The imaging system of claim 1 wherein said receiver comprises a gated detector array.

15. The imaging system of claim 1 wherein said source comprises a laser.

16. The imaging system of claim 1 wherein said source comprises a broad band optical source.

17. An active imaging system for detecting a target comprising:

an electromagnetic radiation source for generating gated interrogating pulse signals having a fixed gate width and directed towards the target;

receiver means for being triggered to receive reflected interrogating pulse signals from the target during preselected fixed window intervals;

means for synchronizing the operation of said source and said receiver means;

circuit means for triggering said receiver means to receive reflected interrogating pulse signals during said preselected fixed window intervals at a rate dependent upon the distance between the target and said receiver means; and means for integrating said received reflected interrogating pulse signals to generate a resultant signal of constant amplitude independent of the distance between said receiver means and the target.

18. The imaging system of claim 17 wherein said circuit means triggers said receiver means such that the trigger rate increases as the distance between said receiver means and the target increases.

19. The imaging system of claim 17 wherein said circuit means triggers said receiver means such that the time duration between successive window intervals decreases as the distance between said receiver means and the target increases.

20. The imaging system of claim 17 wherein said radiation source comprises a laser.

21. The imaging system of claim 17 wherein said receiver means comprises a gated image intensifier.

22. The imaging system of claim 17 wherein the number of reflected interrogating pulse signals received and integrated by said receiver means increases at a rate proportional to four times the distance between said receiver and the target.

23. The imaging system of claim 17 wherein the time duration between successive ones of said preselected fixed time intervals in which said receiver means receives reflected interrogating pulse signals decreases at a rate proportional to the inverse of four times the distance between said receiver and the target.

24. An active imaging system for detection of a target comprising:

laser means for generating gated interrogating pulse signals having a fixed gate width and directed towards the target;

a gated image intensifier for being triggered to receive reflected interrogating pulse signals from the target during preselected fixed window intervals;

means for synchronizing the operation of said laser means and said image intensifier;

circuit means interconnected between said means for synchronizing and said gated image intensifier for triggering said image intensifier to receive reflected interrogating signals during said preselected fixed window intervals at a rate dependent upon the distance between the target and said image intensifier; and means for integrating said received reflected interrogating pulse signals to generate a resultant signal independent of the distance between said image intensifier and the target.

25. The imaging system of claim 24 wherein the number of reflected interrogating pulse signals received and integrated by said image intensifier increases as the distance between said image intensifier and the target increases.

26. The imaging system of claim 24 wherein the time duration between successive ones of said fixed window intervals in which said image intensifier receives reflected interrogating pulse signals decreases as the distance between said image intensifier and the target increases.

27. The imaging system of claim 24 wherein adjacent ones of said fixed window intervals overlap as the distance between said image intensifier and the target increases above a predetermined range.

28. A method employing an active imaging system for detection of a target comprising:
   generating a series of interrogating pulse signals having a fixed gate width directed towards the target;
   receiving at a receiver reflected interrogating pulse signals from the target during preselected fixed window intervals;
   triggering said receiver to receive said reflected interrogating pulse signals during said preselected fixed window intervals; and
   varying the triggering of said receiver in dependence upon the distance between the target and said receiver.

29. The method of claim 28 and further including the step of:
   integrating at said receiver said received reflected interrogating pulse signals to generate a resultant signal of constant amplitude independent of the distance between said receiver and the target.

30. The method of claim 28 wherein the duration between successive ones of said fixed time intervals decreases at a rate proportional to the inverse of four times the distance between the target and said receiver.

31. The method of claim 28 and further including the step of:
   integrating said received reflected interrogating pulse signals such that the number of interrogating pulse signals integrated by said receiver increases at a rate proportional to four times the distance between said receiver and the target.

* * * * *

UNITED STATES PATENT AND TRADEMARK OFFICE
CERTIFICATE OF CORRECTION

PATENT NO. : 4,129,780
DATED : December 12, 1978
INVENTOR(S) : Richard H. Laughlin It is certified that error appears in the above-identified patent and that said Letters Patent are hereby corrected as shown below:

Col. 5, line 55, change "$R=cK, N'^2=K_2N^{\cdot 2}$" to $$--R=\frac{cK_1 N^{\cdot 2}}{2}= K_2 N^{\cdot 2}--.$$

Col. 8, line 5, change "overlaps" to --overlap--.

Signed and Sealed this

Twenty-fifth Day of September 1979

[SEAL]

Attest:

Attesting Officer

LUTRELLE F. PARKER
Acting Commissioner of Patents and Trademarks